United States Patent [19]

Minagawa et al.

[11] 4,224,218
[45] Sep. 23, 1980

[54] STABILIZED VINYL CHLORIDE POLYMER COMPRISING A METAL MONO-ORGANIC PHOSPHITE

[75] Inventors: Motonobu Minagawa, Koshigaya; Tetsuo Sekiguchi, Hasuda; Naoyasu Kurita, Urawa; Yuji Sugawara, Koshigaya, all of Japan

[73] Assignee: Argus Chemical Corporation, Brooklyn, N.Y.

[21] Appl. No.: 945,307

[22] Filed: Sep. 25, 1978

[30] Foreign Application Priority Data

Sep. 25, 1977 [JP] Japan .................. 52-114772

[51] Int. Cl.$^2$ .............................. C08K 5/52
[52] U.S. Cl. ............... 260/45.7 PH; 260/23 XA; 260/45.7 P; 260/45.75 R; 260/45.85 R; 260/45.95 J; 252/400 A
[58] Field of Search ..... 260/23 XA, 45.7 P, 45.7 PH, 260/45.85 R, 45.75 R, 45.95 J, 875; 252/32.5, 400 A, 404

[56] References Cited

U.S. PATENT DOCUMENTS

| | | | |
|---|---|---|---|
| 2,716,092 | 8/1955 | Leistner | 260/23 X A |
| 2,997,454 | 8/1961 | Leistner | 260/23 X A |
| 3,219,605 | 11/1965 | Klemchuk | 260/23 X A |
| 3,231,531 | 1/1966 | Buckley | 260/45.7 PH |

*Primary Examiner*—Donald J. Arnold
*Assistant Examiner*—W. Thompson
*Attorney, Agent, or Firm*—Otto S. Kauder

[57] ABSTRACT

A stabilizer composition is disclosed that enhances the resistance to deterioration upon heating of vinyl chloride polymers. The stabilizer composition comprises (A) a metal salt of a sulfur-and nitrogen- free monocarboxylic acid or a phenol and (b) a metal salt of a phosphorous acid mono-ester in which the molar ratio of phosphorous acid mono-ester to metal is 1:1.

Vinyl chloride polymer compositions stabilized with the above disclosed stabilizer composition are also disclosed.

11 Claims, No Drawings

STABILIZED VINYL CHLORIDE POLYMER COMPRISING A METAL MONO-ORGANIC PHOSPHITE

BACKGROUND OF THE INVENTION

This invention relates to a new stabilizer composition for enhancing the resistance to deterioration upon heating of vinyl chloride polymers, and to vinyl chloride polymers having enhanced resistance to deterioration in initial color, heat stability and clarity as a result of incorporating therein a stabilizer composition according to this invention.

There is a voluminous literature on the stabilization of vinyl chloride polymers. Patent disclosures of materials stated to be useful in minimizing deterioration of vinyl chloride polymers on heating number well over one thousand. Among the more important heat stabilizers in commercial use are mild alkalis such as sodium carbonate, disodium phosphate, and sodium and potassium salts of partially esterified phosphoric acids; carboxylates and phenolates of zinc, cadmium, and the alkaline earth metals; inorganic and organic lead salts; organotin carboxylates, as disclosed by Quattlebaum in U.S. Pat. No. 2,307,157; organotin mercaptides as disclosed by Leistner in U.S. Pat. Nos. 2,641,588 and 2,641,598; various metal-free organic compounds such as the polyols, e.g. mannitol, sorbitol, glycerol, pentaerythritol, organic phosphites, 1,2-epoxides, e.g., soybean oil epoxide, isooctyl epoxystearate, and the diglycidyl ether of 2,2-bis(p-hydroxyphenyl) propane, and nitrogen compounds, e.g., phenylurea, N,N'-diphenylthiourea, and 2-phenylindole. For detailed discussion of heat stabilizers for vinyl halide resins, reference may be made to the articles, L. I. Nass, in "Encyclopedia of Polymer Science and Technology" (N. Bikales, ed.) Vol. 12, pages 737 to 768 (1970); N. L. Perry "Barium-Cadmium Stabilization of Polyvinyl Chloride," *Rubber Age* 85 449–452 (June, 1959), and by H. Verity-Smith, *British Plastics* 27 176–179, 213–217, 307–311 (1954); the brochure by the same author *The Development of the Organotin Stabilizer* (Tin Research Institute, 1959) and the book *La Stabilisation des Chlorures de Polyvinyle* by F. Chevassus (Amphora, Paris, 1957).

C. F. Prutton in U.S. Pat. No. 2,224,695 of Dec. 10, 1940, disclosed mono-, di-, and tri-esters of phosphorous acid and derived salts as examples of inhibitors for protecting the surface of a metal to which the inhibitors are applied against oxidation and corrosion. Prutton's inhibitors are described as preferably of such nature that in contact with aqueous media they will yield a solution having a pH of below 7.

G. Denison Jr., in U.S. Pat. No. 2,346,155 of Apr. 11, 1944 disclosed a hydrocarbon oil containing a combination of stabilizing agents, comprising a thioether or seleno ether and an oxide, sulfide, or selenide having directly connected to an oxygen, sulfur or selenium atom both a metal in a basic form and an acid-forming element such as those of Periodic groups IIIA, IV, VB, and VIB to which is attached an organic substituent either directly or through an intervening atom. Denison's disclosure encompasses untold thousands of compounds in over 150 classes, of which 28 are classes of phosphorus compounds among which phosphorous acid monoesters and di-esters are mentioned in the form of metal salts.

J. McNab in U.S. Pat. No. 2,391,099 of Dec. 18, 1945 disclosed the use of mineral lubricating oils of a combination of two additives, the first being a metallic salt of an inorganic acid having at least one oil-solubilizing organic group and the second being an alkylated p-cresol. McNab's metallic salt can be derived from any of a large number of acids containing sulfur, phosphorus, or both, including diisobutylphenyl phosphorous acid $(C_8H_{17}C_6H_4O)_2(OH)P$, with any metal, with salts of Group II stated to be particularly effective.

W. Leistner in U.S. Pat. No. 2,564,646 of Aug. 14, 1951 disclosed vinyl chloride polymer compositions containing polyvalent metal carboxylate stabilizers together with an alkyl or aryl phosphite anti-clouding agent, and in U.S. Pat. No. 2,716,092 of Aug. 23, 1955 disclosed the use of hydrocarbon-substituted phenol metal salts in vinyl chloride polymer stabilizers along with metal carboxylates and organic phosphites.

Additional representative disclosures of organic esters of phosphorous acid used in vinyl chloride polymer stabilizers are by F. Hansen in U.S. Pat. No. 2,867,594 of Jan. 6, 1959, J. Darby in U.S. Pat. No. 2,951,052 of Aug. 30, 1960, L. Friedman in U.S. Pat. No. 3,047,608 of July 31, 1962, R. Buckley in U.S. Pat. No. 3,342,767 of Sept. 19, 1967 and J. Scullin in U.S. Pat. No. 3,202,622 of Aug. 24, 1965.

W. Leistner in U.S. Pat. No. 2,997,454 of Aug. 22, 1961 disclosed polyvinyl chloride compositions of excellent initial color stabilized with a combination of an organic triphosphite with a heavy metal fatty acid salt to which there is added a phosphorus compound having at least one hydrogen atom of acidic character. The phosphorus acids in Leistner's compositions are defined by the formula:

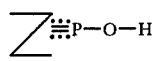  (V)  Phosphinic acids

In this formula, phosphorus has a valence of three or five, the additional two valences being indicated by dotted line bonds. Typical phosphorus acids coming within this general formula are the following:

(VI)  Phosphorous acid

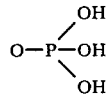

(I) (a) 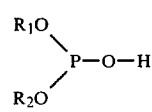  (b) 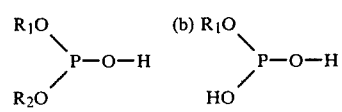

(VII)  Phosphoric acid

| | -continued | | |
|---|---|---|---|
| (II) (a) | Acid esters of phosphorus acid 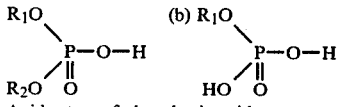 | (VIII) | Metaphosphoric acid 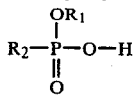 Pyrophosphoric acid |
| (III) (a) | Acid esters of phosphoric acids 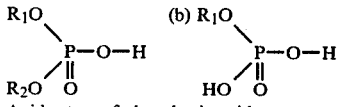 | | |
| (b) | Acid esters of phosphonic acids 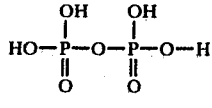 | | In the above formulae $R_1$ and $R_2$ represent an organic aliphatic, aromatic or nonaromatic alicyclic hydrocarbon or heterocyclic radical having from one to about thirty carbon atoms. $R_1$ and $R_2$ in I, II, III (a) and IV may be the same or different. |
| (IV) | Phosphonic acids | | |
| (IV) | 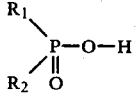 | | |

P. Klemchuk in U.S. Pat. No. 3,219,605 of Nov. 23, 1965 disclosed cadmium, barium, calcium, or zinc salts of monoalkyl phosphites are remarkably effective light stabilizers for polyvinyl chloride compositions, alone or in combination with other light and/or thermal stabilizers. The metal salts are defined by the formula:

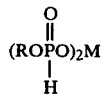

wherein

R is an alkyl radical, e.g. alkyl having from 1 to 30 carbon atoms, preferably having from 1 to 12 carbon atoms, and M is a divalent metal which may be cadmium, barium, calcium or zinc.

Farbwerke Hoechst in French Pat. No. 1,412,321 of Aug. 16, 1965 disclosed the stabilization against light of polyvinyl chloride with 0.1 to 5% by weight of nickel organic phosphites containing only nickel, phosphorus, carbon, hydrogen and oxygen, along with barium-cadmium soaps, organic phosphite, epoxy compounds, and optionally ultraviolet absorbers.

R. Harrington, Jr. in U.S. Pat. No. 3,274,014 of Sept. 20, 1966 disclosed yarn compositions of synthetic fibers having incorporated a small amount of a metal monoalkyl or monoaryl phosphate, metal dialkyl phosphate, metal alkyl phosphonate, metal alkyl (alkyl phosphonate) or metal dialkylphosphite are resistant to ultraviolet light. Examples show among others yarns spun from dopes of modified vinylidene chloride-acrylonitrile copolymer containing zinc diethyl phosphite.

G. Juredine in U.S. Pat. No. 3,284,386 of Nov. 8, 1966 disclosed organic metallophoshite stabilizers for vinyl chloride polymers represented by the formula

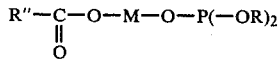

in which M can be barium, calcium, and strontium and R and R" can be alky- groups, cycloaliphatic groups, aryl groups, aralkyl groups, alkaryl groups, and their halo substituted derivatives, R having from 4 to 18 and R" from 3 to 17 carbon atoms.

F. Kujawa in U.S. Pat. No. 3,412,118 of Nov. 19, 1968 disclosed phosphorous acid monoesters of 2,6-disubstituted and 2,4,6-trisubstituted phenols and their metal salts. Kujawa's monoesters have the formula

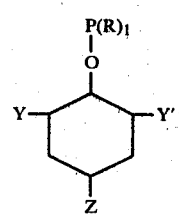

wherein R is selected from the group, consisting of hydroxyl and halogen radicals, Y and Y' are organic radicals containing at least four carbon atoms, and Z is selected from the group consisting of hydrogen, halogen, and organic radicals containing at least four carbon atoms.

The metal salts of the primary aryl phosphites of this invention have the formulas:

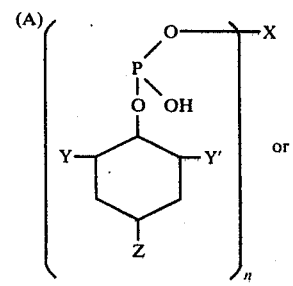

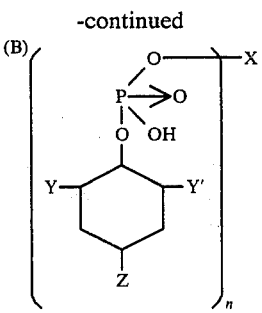

wherein Y and Y' are organic radicals containing at least four carbon atoms, Z is selected from the group consisting of hydrogen, halogen, and organic radicals containing at least four carbon atoms, X is selected from the group consisting of ammonium, substituted ammonium and metals, and n is an integer from 1 to 4 representing the valence of X. Two formulas have been illustrated to show that two forms of primary phosphites are believed to exist. However, Formula A will be used throughout this application as the presently preferred form.

In Kujawa metal salts, the molar ratio of phosphorous acid monoester groups to metal atoms is equal to the valence of the metal, so that for bivalent metals Kujawa teaches only salts in which there are two phosphorous acid monoester groups for each metal atom.

Kujawa points out prior art "primary aryl phosphites, including the corresponding salts, are too unstable to moisture to permit their general usage", while his aryl phosphites and salts are stable.

SUMMARY OF THE INVENTION

In accordance with this invention, a vinyl chloride polymer composition having enhanced resistance to deterioration in color, clarity, and compatibility when heated at 175° C. comprises a vinyl chloride polymer and 0.01 to 10 parts by weight (per 100 parts of vinyl chloride polymer) of a stabilizer composition comprising (A) at least one metal salt of a monohydric phenol having 6 to 30 carbon atoms or of a nitrogen and sulfur free monocarboxylic acid having 6 to 24 carbon atoms, the metal being any one or more of antimony, an alkali metal having an atomic weight less than 50, a Group II metal having an atomic weight between 20 and 150, or a Group IV metal having an atomic weight between 80 and 220; and (B) at least one phosphorous acid monoester salt of a Group II metal having an atomic weight between 20 and 150, stannous tin, dialkyltin, or lead in which the molar ratio of phosphorous acid monoester to metal is 1:1. The ratio of metal phenol or carboxylic acid salt to phosphorous acid monoester metal salt in the stabilizer composition is preferably within the range from 8:1 to 1:8.

The phosphorous acid monoester metal salt can be represented by the formula

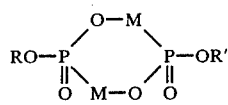

in which M is a stannous tin, lead, magnesium, calcium, zinc, strontium, cadmium, or barium atom or a dialkyltin group, and each of R and R' independently is an alkyl group having 1 to 20 carbon atoms, an aralkyl group having 7 to 20 carbon atoms, a cycloalkyl group having 5 to 20 carbon atoms, an aryl or alkaryl group having 6 to 24 carbon atoms and not more than one ortho-substituent, or an ether-alcohol group having 3 to 40 carbon atoms and 1 to 12 ether groups.

The metal in the carboxylic acid or phenol metal salt can be the same as or different from the metal in the phosphorous acid monoester metal salt.

DESCRIPTION OF PREFERRED EMBODIMENTS

The metal carboxylic acid or phenol salt component of the stabilizer is preferably a salt of a bivalent metal, such as barium, cadmium, lead, calcium, magnesium, strontium, stannous tin, and zinc. Four-valent tin salts with two of the four valences linked through carbon to alkyl groups, i.e. dialkyltin salts such as dimethyltin, di-n-butyltin, di-isobutyltin, di-2-ethylhexyltin and di-n-octyltin carboxylates and substituted phenolates, are also among the preferred metal salts in the stabilizer composition according to this invention. In the salt, the acid can be any mono-carboxylic acid free of nitrogen and sulfur having from six to twenty-four carbon atoms. The aliphatic, aromatic, alicyclic and oxygen-containing heterocyclic organic acids are operable as a class. By the term "aliphatic acid" is meant any open chain carboxylic acid, substituted, if desired, with non-reactive groups, such as halogen, and hydroxyl. By the term "alicyclic" it will be understood that there is intended any cyclic acid in which the ring is non-aromatic and composed solely of carbon atoms, and such acids may if desired have inert, non-reactive substituents such as halogen, hydroxyl, alkyl radicals, alkenyl radicals and other carbocyclic ring structures condensed therewith. The oxygen containing heterocyclic compounds can be aromatic or non aromatic and can include oxygen and carbon in the ring structure, such as alkyl substituted furoic acid. The aromatic acids likewise can have nonreactive ring substituents such as halogen, alkyl and alkenyl groups, and other saturated or aromatic rings condensed therewith.

As exemplary of the acids which can be used in the form of their metal salts there can be mentioned the following: hexoic acid, 2-ethylhexoic acid, sorbic acid, n-octoic acid, isooctoic acid, 3,5,5,-trimethyl hexoic acid, pelargonic acid, capric acid, neodecanoic acid, undecylenic acid, lauric acid, myristic acid, isodecanoic acid, palmitic acid, isostearic acid, stearic acid, oleic acid, ricinoleic acid, erucic acid, behenic acid, chlorocaproic acid, 12-hydroxy stearic acid, 12-ketostearic acid, phenyl stearic acid, benzoic acid, phenylacetic acid, p-t-butylbenzoic acid, ethylbenzoic acid, isopropylbenzoic acid, bromobenzoic acid, salicyclic acid, naphthoic acid, 1-naphthaleneacetic acid, orthobenzoyl benzoic acid, 5-t-octylsalicylic acid, naphthenic acids derived from petroleum, abietic acid, dihydroabietic acid, hexahydrobenzoic acid, and methyl furoic acid, as well as partially esterified dibasic acids such as monobutyl phthalate, isooctyl maleate, ethylene glycol maleate, and 2-ethoxy ethylmaleate.

The water-insoluble salts are preferred, because they are not leached out when the plastic is in contact with water. Where these salts are not known, they are made by the usual types of reaction, such as by mixing the acid, acid chloride or anhydride with the corresponding oxide or hydroxide of the metal in a liquid solvent, and heating, if necessary, until salt formation is complete.

In combination with the above metal salts of organic acids, or in lieu thereof, a metal salt of an optionally hydrocarbon-substituted phenol can be used. The hydrocarbon substituents contain from one to twenty-four carbon atoms each. The metal can be an alkali metal or alkaline earth metal such as sodium, potassium, lithium, calcium, strontium, magnesium, and barium. Among such polyvalent metal phenolates there can be mentioned the magnesium, barium, calcium, strontium, tin and zinc salts of phenol, ethylphenol, cresol, xylenol, butyl phenol, isoamyl phenol, isooctyl phenol, 2-ethylhexyl phenol, t-nonylphenol, n-decyl phenol, t-dodecyl phenol, t-octyl phenol, isohexyl phenol, octadecyl phenol, diisobutyl phenol, methyl propyl phenol, diamyl phenol, methyl isohexyl phenol, methyl t-octyl phenol, di-t-nonyl phenol, ortho or para phenyl phenol. The metal phenolate should be compatible with the halogen-containing resin.

Mixtures of salts of various metals can be used, and many such mixtures are known to give enhanced effects, such as mixed zinc and tin salts with the alkaline earth metal salts, e.g., barium and zinc stearates, as in U.S. Pat. No. 2,446,976.

In the metal 1:1 phosphorous acid monoester according to this invention, aromatic R groups include phenyl and preferably groups having 7 or more carbon atoms such as 1-naphthyl, 2-naphthyl, tolyl, xylyl, ethylphenyl, butylphenyl, t-butylphenyl, octylphenyl, isooctylphenyl, nonylphenyl, 2,4-di-t-butylphenyl, p-dodecylphenyl, didodecylphenyl, cyclohexylphenyl, dicyclohexylphenyl, benzyl, 1-phenylethyl, 2-phenylethyl, 3-phenylpropyl, 7-phenylheptyl, p-ethoxybenzyl, 2,4-dichlorobenzyl, p-pentadecylbenzyl, and trimethylbenzyl.

Aliphatic R groups include methyl, ethyl, propyl, isopropyl, butyl, isobutyl, t-butyl, s-butyl, amyl, neopentyl, isoamyl, hexyl, decyl, isodecyl, lauryl, tridecyl, $C_{12-15}$ mixed alkyl, stearyl, eicosyl, dodosyl, triacontanyl, allyl, methallyl, oleyl, 2-hydroxyethyl, 12-hydroxyoctadecyl, and ether substituted groups such as 2-methoxyethyl, 2-ethoxyethyl, 2-isopropoxyethyl, 2-butoxyethyl, 2-isobutoxyethyl, 2-hexyloxyethyl, 2-cyclohexyloxyethyl, 2-phenoxyethyl, 2(2'-methoxyethoxy)ethyl, 2(2'-ethoxyethoxy)ethyl, 2(2'-isopropoxyethoxy)ethyl, 2(2'-butoxyethoxy)ethyl, 2(2'-butoxyethoxy)ethyl, 2(2'-isobutoxyethoxy)ethyl, and residue of triethylene glycol monoethylether, -monobutylether, or residue of glycerin-1,2-dimethyl ether, -1,3-dimethylether, -1,3-diethylether, -1-ethyl-2-propylether, or nonylphenoxypolyethoxyethyl, and lauroxypolyethoxyethyl.

Cycloaliphatic groups include cyclopentyl, cyclohexyl, methylcyclopentyl, dimethylcycobutyl, 4-methylcyclohexyl, 4-t-butylcyclohexyl, cyclooctyl, cyclododecyl, 1,2,3,4-tetrahydro-2-naphthyl, decahydro-1-naphthyl, hydrodicyclopentadienyl, cholesteryl, and dehydroabietyl.

Several methods are available to prepare the 1:1 phosphorous acid monoester metal salts according to this invention, for example the reaction of a phosphorous acid monoester dialkali metal salt with a halide or a carboxylate of the desired metal (reactions 1a and 1b below), or the reaction of a phosphorous acid diester with a metal oxide in equimolar proportions with displacement of one of the esterifying groups of the diester (reaction 2, particularly suitable for preparing dialkyltin salts), or by heating a phosphorous acid diester monoalkali metal salt with a metal carboxylate (reaction 3 below). The latter reaction produces as a by-product a carboxylic acid ester that need not be removed and can be left if desired with the product to function as part of the solvent for its use in a liquid stabilizer formulation.

REACTION 1a, illustrated by preparation of isooctyl strontium phosphite (1:1)

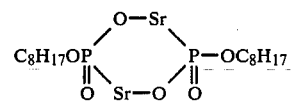

REACTION 1b, illustrated by preparation of 2-butoxyethyl stannous phosphite (1:1)

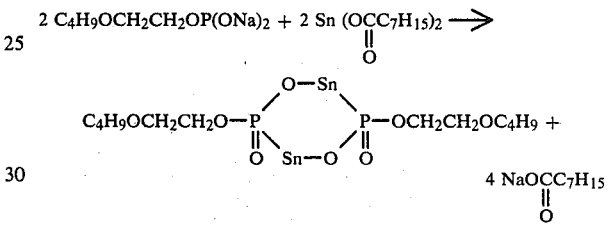

REACTION 2, illustrated by preparation of 2-ethylhexyl di-n-octyltin phosphite (1:1)

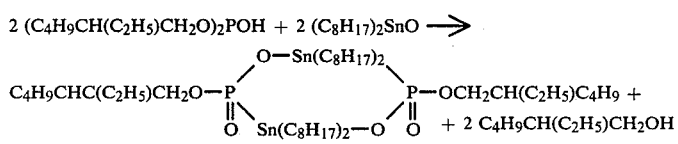

REACTION 3, illustrated by preparation of benzyl zinc phosphite (1:1)

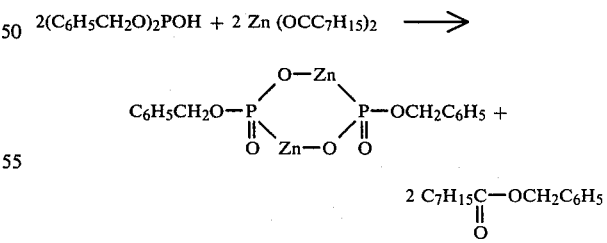

When two different phosphorous acid ester starting materials are used simultaneously, there can be obtained a dimeric phosphorous acid monoester metal salt with two dissimilar esterifying groups, as shown by reaction 4 below.

REACTION 4, illustrated by preparation of isodecyl octyl dicadmium diphosphite

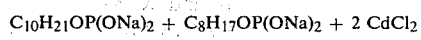

-continued

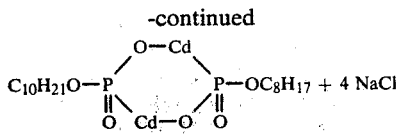 + 4 NaCl

SYNTHESIS EXAMPLE—1

Tridecyl barium phosphite (1:1)

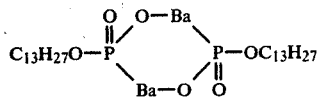

Mono tridecylphosphite disodium salt 123 g (0.4 mole), and ethanol 700 ml were charged into a reaction flask and dissolved by stirring at room temperature. To this solution, 156 g barium iodide solution in ethanol (0.4 mole) was added and allowed to react for one hour at room temperature. The compound precipitated was filtered off, repeatedly washed with water until free of sodium iodide and dried to obtain 152 g of white powder.

Yield: 95% of theoretical. Ba% 34.21 (Calculated 34.34)

P%: 7.69 (Calculated 7.77)

SYNTHESIS EXAMPLE—2

2(2-Butoxyethoxy)ethyl magnesium phosphite (1:1)

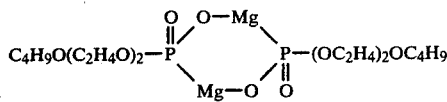

Disodium mono(butoxyethoxyethyl) phosphite 135 g (0.5 mole), and n-butanol 500 ml were charged to a reaction flask and dissolved by stirring at room temperature. To this was added a butanol solution of 155 g magnesium 2-ethylhexoate (0.5 mole), and heated to react for three hours at 100° C. The compound precipitated was filtered off, repeatedly washed with water and, dried to obtain 119 g of a white powder.

Yield: 96% of theoretical Mg.: 9.59% (calculated 9.68)

P%: 12.42% (calculated 12.50)

SYNTHETIC EXAMPLE—3

Tridecyl p-t-butylphenyl dibarium diphosphite

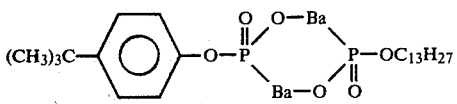

Phosphorous acid bis(p-t-butylphenyl) ester sodium salt 73.6 g (0.2 mole), phosphorous acid bis(tridecyl) ester sodium salt 93.6 g (0.2 mole), barium 2-ethylhexoate of 169.2 g (0.4 mole) and xylene 700 ml were charged into a reaction flask and reacted at the temperature of refluxing xylene for 7 hours while stirring.

After the reaction, a large volume of ethanol was poured into the solution and precipitated the desired compound which was filtered. The precipitate was washed and ethanol and water, and dried to obtain the product as white powder weighing 143 g.

Yield: 95%, Ba content: 36.51% (Theoretical 36.63%).

P content: 8.23% (theoretical 8.29%)

The stabilizer composition of this invention is applicable to any vinyl chloride polymer. The term "vinyl chloride polymer" as used herein is inclusive of any polymer formed at least in part of the recurring group,

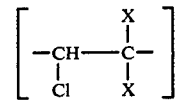

and having a chlorine content in excess of 40%. In this group, the X groups can each be either hydrogen or chlorine. In polyvinyl chloride homopolymers, each of the X groups is hydrogen. Thus, the term includes not only polyvinyl chloride homopolymers but also afterchlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with acrylonitrile, 1-butene, propylene, ethylene, 1-hexene, or vinyl n-dodecyl ether. The invention also is applicable to mixtures of polyvinyl chloride in a major proportion with a minor proportion of other synthetic resins such as chlorinated polyethylene or copolymers of acrylonitrile with butadiene and styrene.

The invention is of application to the stabilization of rigid polyvinyl chloride resin compositions, that is, resin compositions which are formulated to withstand high processing temperatures, of the order of 190° C. and higher, and of plasticized polyvinyl chloride resin compositions of conventional formulation where resistance to heat distortion is not a requisite. The respective definitions of rigid and plasticized resins are as follows. The rigid resins are those resins to which plasticizers are not added, and which are generally worked at about 190° C. The ASTM definition (1961 D-883, Part 9, page 804) is as follows:

"a plastic which has a stiffness or apparent modulus of elasticity greater than 7000 grams per square centimeter (100,000 psi) at 23° C."

The plasticized resin would therefore have a modulus of elasticity of less than 7000 grams per square centimeter, and would have added to it the plasticizer compound. Conventional plasticizers well known to those skilled in the art can be employed such as, for example, dioctyl phthalate, octyl diphenyl phosphate and epoxidized soybean oil.

The stabilizer combinations of this invention are effective in improving initial color and heat stability of polyvinyl chloride resins in the absence of any other additives. However, it has long been recognized that polyvinyl chloride resins containing several types of heat stabilizers are better protected than those containing only one heat stabilizer. It is therefore an important aspect of this invention that these stabilizer combinations when used with additional heat stabilizers, provide greatly improved resistance to heat degradation not obtainable with the other heat stabilizers alone.

The stabilizer composition of this invention shows synergistic interaction and provides improved effectiveness when used together with certain known useful additives, including 1,2-epoxides, hindered phenols, organic phosphites, the esters, amides, and hydrazides of thiodialkylenedicarboxylic acids, 3-aminocrotonic acid, and nitrilotrialkylenetricarboxylic acids, ketoacetic acid compounds, aliphatic polyhydric alcohols having 3 to 8 alcoholic hydroxyl groups, aliphatic and aromatic betadiketones, and certain polyether alcohol esters of phosphoric acid.

Phenol stabilizers can be included with the stabilizer composition of this invention in amounts corresponding to 0.01 to about 0.2 parts per parts of polymer being stabilized. Typical phenol stabilizers are butylated hydroxy-toluene (BHT), 4,4'-isopropylidenebisphenol, and 1,1,3-tris(2'methyl-4'-hydroxy-5'-t-butylphenyl)butane. A comprehensive disclosure of phenol stabilizers at column 16 line 49 to column 21 line 8 of M. Minagawa U.S. Pat. No. 3,849,370 issued Nov. 19, 1974 is here incorporated by reference.

Aliphatic polyhydroxy compounds can be included with the stabilizer composition of this invention in amounts corresponding to 0.1 to about 1 part per 100 parts of polymer being stabilized. Typical aliphatic polyhydroxy compounds are glycerol, polyglycerol, mono-, di-, and tripentaerythritol, mannitol, sorbitol, and partial esters of these with saturated and unsaturated fatty acids having 6 to 22 carbon atoms.

Organic phosphite stabilizers can be included with the stabilizer composition of this invention in amounts corresponding to 0.05 to about 2 parts by weight per 100 parts by weight of polymer being stabilized. Typical phosphite stabilizers are triphenyl phosphite, diphenyl phosphite, tris(nonylphenyl) phosphite, 2-ethylhexyl diphenyl phosphite, diisodecyl phenyl phosphite, trinonyl phosphite, and pentaerythritol bis(n-octadecyl phosphite). The phosphite stabilizer can have one or a plurality of phosphite ester groups and from 10 to about 75 carbon atoms. A comprehensive disclosure of organic phosphite stabilizers at column 13 line 63 to column 15 line 48 of M. Minagawa U.S. Pat. No. 3,849,370 is here incorporated by reference.

Oxirane or 1,2-epoxide stabilizers can be included with the stabilizer composition of this invention in amounts corresponding to 0.2 to about 20 parts by weight per 100 parts by weight of polymer being stabilized. Typical 1,2-epoxide stabilizers are epoxidized polybutadiene, epoxysoybean oil, epoxylinseed oil, and 2-ethylhexyl epoxystearate. The epoxide stabilizer can have one or a plurality of oxirane or 1,2-epoxide groups and from 15 to 150 carbon atoms. A comprehensive disclosure of epoxide stabilizers at column 26 lines 12 to 40 and column 27 lines 17 to 51 of M. Minagawa U.S. Pat. No. 3,869,423 is here incorporated by reference.

The esters, amides, and hydrazides of thiodialkylene dicarboxylic acids and nitrilotri-alkylenetricarboxylic acids can be included with the stabilizer composition of this invention in amounts corresponding to 0.1 to about 1 part per 100 parts of polymer. Typical of these are dimethyl thiodipropionate, dilauryl and distearyl thiodipropionates, 2,2'-thiobis(acetyl ethanolamine), 3,3'-thiobis(propionyldiisopropanolamine, nitrilotriacetic acid (NTA) propylene glycol ester, NTA tris (ethylamide), NTA bis(hydroxyethyl) N-butylamide, 3,3'-thiodipropionyldihydrazide and 6,6'-thiodihexanoyldihydrazide. A comprehensive disclosure of thiodipropionate compounds that can be used from column 21 line 9 to column 22 line 65 of M. Minagawa U.S. Pat. No. 3,849,370 is here incorporated by reference.

Ketoacetic acid compounds that can be used with the stabilizer compositions of this invention in amounts of about 0.05 to about 0.5 parts per 100 parts of polymer being stabilized include 2-ethylhexyl acetoacetate, glyceryl tris(acetoacetate) and dehydroacetic acid. A comprehensive disclosure of ketoacetic acid compounds that can be used from column 2 line 32 to column 5 line 10 of U.S. Pat. No. 3,346,536 issued Oct. 10, 1967 is here incorporated by reference.

Organic nitrogen compounds that can be used with the stabilizer compositions of this invention in amounts of about 0.05 to about 0.5 parts per 100 parts of polymer being stabilized include 2-ethylhexyl 3-aminocrotonate, 1,4-butanediol bis(3-aminocrotonate) and 2,2'thiodiethyl 3-aminocrotonate; thiocarbanilide and 2-phenylindole, 1,3-dibutylthiourea, phenylurea, and p-ethoxyphenylurea.

Betadiketones also called 1,3-diketones, or diacylmethanes have two to three acyl groups linked to a single carbon atom. The acyl groups can be aromatic, cycloaliphatic, or aliphatic, and preferably have from 2 to 30 carbon atoms. Using the diacylmethane system of nomenclature, illustrative 1,3-diketone compounds that can be used in the stabilized vinyl chloride compositions of this invention include acetylhexanoyl-methane, acetyl-heptanoyl-methane, hexanoyl-propanoyl methane, acetyl-octadecanoyl-methane, acetyl-tetradecanoyl-methane, acetyl-dodecanoyl-methane, di-octadecanoyl-methane, butanoyl-octanoyl-methane, 1-acetyl-1-octanoyl-ethane, triacetylmethane, trihexanoylmethane, acetyl-benzoyl-methane, hexanoyl-benzoyl-methane, Octadecanoyl-benzoyl-methane, tetradecanoyl-benzoyl-methane, Dodecanoyl-benzoyl-methane, formyl-benzoyl-methane, heptanoyl-benzoyl-methane, acetyl-hexahydrobenzoylmethane, dibenzoylmethane, phenylacetyl-benzoyl-methane, benzoyl-nonylbenzoyl-methane, benzoyldiacetyl-methane, di(hexahydrobenzoyl)methane, tribenzoylmethane, benzoyl-p-methoxybenzoyl-methane, di(p-methoxybenzoyl)methane, di(p-chlorobenzoyl)methane, di(3,4-methylenedioxbenzoyl)methane, 1-acetyl-1-benzoylnonane, alpha-acetyl-alpha-benzoyl-toluene, di(p-t-butylbenzoyl)methane, benzoyl-trifluoroacetyl-methane, diacetylmethane, acetyl-octanoyl-methane, and dipivaloylmethane.

Alkyl acid phosphates have 1 to 2 alkyl groups of 8 to 20 carbon atoms per phosphate ester group. Stearyl acid phosphate, di(2-ethylhexyl)acid phosphate, and dilauryl acid phosphate are representative.

Ether alcohol acid phosphate esters have 1 to 2 ether alcohol groups per phosphate ester group, and can be presented by a formula

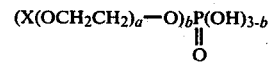

where the number of ether groups in the ether alcohol represented by a is from 1 to from 22 and the number of ether alcohol groups represented by b is from 1 to 2, and X is a hydrocarbon group having 1 to about 20 carbon atoms. Commercial mixtures of homologous products, usually characterized by an average value of a, such as ethoxylated nonylphenol phosphate with average of 6 oxyethylene units or ethoxylated $C_{12}$–$C_{15}$ alkyl phosphate with average of 12 oxyethylene units are satisfactory.

Stabilizer compositions in accordance with this invention can be in solid, liquid or paste form. Liquid compositions can be prepared by blending the ingredients and heating at 40° to 200° C. for up to 6 hours to achieve visual homogeneity and storage stability. Inert ingredients that can be added to the stabilizer compositions to improve their handling convenience include solvents such as hydrocarbons, 2-ethylhexanol, isodecyl alcohol, 2-ethoxyethanol, and 2(2-butoxyethoxy)ethanol; paste consistency modifiers such as finely divided silica, polyethylene glycols and polypropylene glycols and their monoalkyl and monaryl ethers, and water; anticaking agents such as talc, magnesium trisilicate, sodium silicoaluminate, and aluminum calcium silicate.

Following are the methods used in testing vinyl chloride polymer compositions containing stabilizer compositions according to this invention or control compositions used for comparison purposes.

Oven heat stability: Samples of each indicated formulation proportioned to 200 grams of vinyl chloride polymer are compounded on a two-roll mill until well mixed and removed in the form of sheets 1 mm in thickness. Strips cut from each sheet are exposed in an air circulating oven at the indicated temperature, and one strip of each formulation removed every five minutes and attached to a record card. Heat stability was recorded as the time in minutes to the first failure point represented by a deep orange, red, brown or black color.

Clarity and Initial Color: These properties are rated visually by comparing samples of each indicated formulation to a standard, to which is assigned the rating "medium". Unless otherwise indicated, the standard used is a sample of Control 1-1, e.g. the base formulation of Example 1 with 0.7 part barium stearate and 0.3 part zinc stearate as stabilizers. Clarity is rated by viewing samples against a black background and initial color by viewing samples against a white background.

Plate-out: Calender or roll plate-out is caused by an incompatibility of vinyl chloride polymer compound constituents under processing conditions with subsequent deposit on the rolls of the equipment. As the deposit builds up in thickness, it will affect the surface appearance of the vinyl sheeting being produced and it may interfere with heat sealability and printability of the material.

Plate-out is measured through incorporation in the test compound of a red pigment which tends to disperse within the plate-out layer. The red plate-out layer on the mill rolls is then picked up by a clean-up batch. The extent of discoloration of the clean-up batch is a measure of the test compound's tendency to plate-out.

The test procedure is as follows:

There is added to the test compound 2 phr of a 50% pigment dispersion in DOP of Permanent Red 2B pigment. The test compound is charged to the laboratory mill and allowed to run on the mill without disturbing it 3 minutes after the compound is fused and well mixed. The mill temperature is 172°–177° C. After 3 minutes, the red pigmented compound is removed from the mill and discarded. The following clean-up compound is then charged to the mill and run for 3 minutes.

| | | |
|---|---|---|
| Resin | 100 | parts by weight |
| DOP | 30 | |
| TiO$_2$ | 2 | |
| Precipitated silica | 2 | |
| Liquid cadmium-barium stabilizer | 2 | |
| Stearic acid | 0.5 | |

The quantity of clean-up compound is proportioned to 200 parts of resin. The clean-up compound removes from the mill the plate-out and red pigment left from the test compound. The extent of color development of the clean-up compound is a measure of the test compound's plate-out characteristics. A numerical measure of plate-out is provided by comparing the colored clean-up compound with a series of standard compounds to which known amounts of the red pigment are added. The numerical "plate-out value," then, is the concentration of pigment, in mg/kg of resin, that most nearly matches the color of the clean-up compound at the end of the test.

Weatherability: Samples are exposed in a carbon arc accelerated weathering unit (Atlas Electric Devices Co. "Weatherometer") operated without water spray at 52° C. black panel temperature and 41°–44° C. air temperature. Samples are examined once daily for failure signs including spotting, uniform darkening, stiffening, and/or embrittlement, any one of which marks the failure of the sample. Weatherability is expressed in hours to such failure.

The phosphorous acid monoester metal salts contained in stabilizer compositions examined in vinyl chloride polymers stabilized according to this invention are included in the listing of compounds by name and formula in Table 1.

TABLE 1

PHOSPHOROUS ACID MONOESTER METAL (1:1) SALTS

1. Isooctyl barium phosphite (1:1)

$$C_8H_{17}O-P\overset{O}{\underset{Ba-O}{\diagdown}}\overset{O-Ba}{\diagup}\overset{}{\diagdown}P-OC_8H_{17}$$

2. Octyl tridecyl dicalcium diphosphite (1:1)

$$C_8H_{17}O-P\overset{O}{\underset{Ca-O}{\diagdown}}\overset{O-Ca}{\diagup}\overset{}{\diagdown}P-OC_{13}H_{27}$$

3. Tridecyl barium phosphite (1:1)

$$C_{13}H_{27}O-P\overset{O}{\underset{Ba-O}{\diagdown}}\overset{O-Ba}{\diagup}\overset{}{\diagdown}P-OC_{13}H_{27}$$

4. Tridecyl magnesium phosphite (1:1)

TABLE 1-continued
PHOSPHOROUS ACID MONOESTER METAL (1:1) SALTS

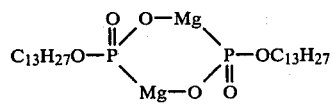

5. Dodecyl strontium phosphite (1:1)

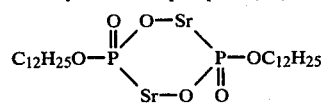

6. Octadecyl barium phosphite (1:1)

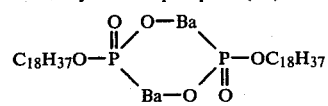

7. Benzyl tridecyl dibarium diphosphite

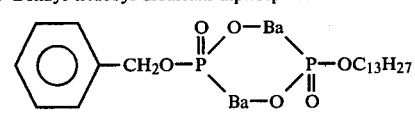

8. p-Methylbenzyl zinc phosphite (1:1)

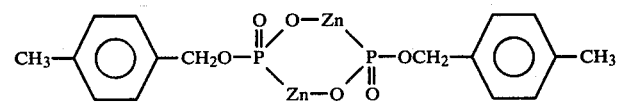

9. 2-Butoxyethyl barium phosphite (1:1)

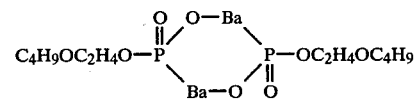

10. 2(2-butoxyethoxy)ethyl magnesium phosphite (1:1)

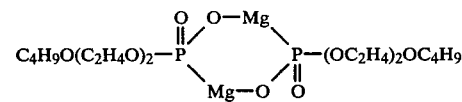

11. Isodecyl strontium phosphite (1:1)

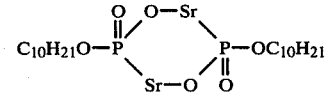

12. Isodecyl 2-phenoxyethyl dibarium diphosphite (1:1)

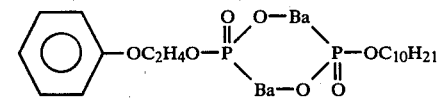

13. Phenyl strontium phosphite (1:1)

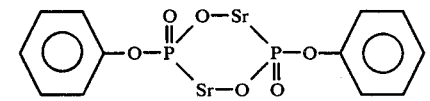

14. p-Tolyl barium phosphite (1:1)

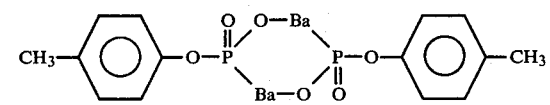

15. p-t-Butylphenyl tridecyl dibarium diphosphite

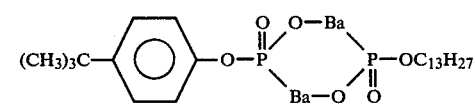

16. Nonylphenyl calcium phosphite (1:1)

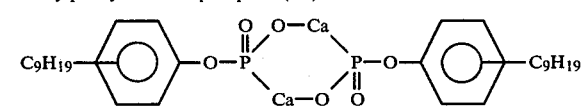

17. 2(2-methoxyethoxy)ethyl nonylphenyl dibarium diphosphite (1:1)

TABLE 1-continued
PHOSPHOROUS ACID MONOESTER METAL (1:1) SALTS

18. Butyl p-t-octylphenyl dimagnesium diphosphite (1:1)

19. p-Xylyl barium phosphite (1:1)

20. Octylphenoxy-pentaethylenoxyethyl barium phosphite (1:1)

21. Nonylphenoxy-heptaethylenoxyethyl octyl dibarium diphosphite

22. Phenyl tridecyl dizinc diphosphite (1:1)

23. Cyclohexyl barium phosphite (1:1)

24. 2-Ethylhexyl cadmium phosphite (1:1)

25. Octyl tridecyl dilead diphosphite

26. Tridecyl stannous phosphite (1:1)

27. Benzyl cadmium phosphite (1:1)

28. 2-Butoxyethyl cadmium phosphite (1:1)

29. 2(2-Butoxyethoxy)ethyl lead phosphite (1:1)

30. Phenoxyethyl lead phosphite (1:1)

TABLE 1-continued
PHOSPHOROUS ACID MONOESTER METAL (1:1) SALTS

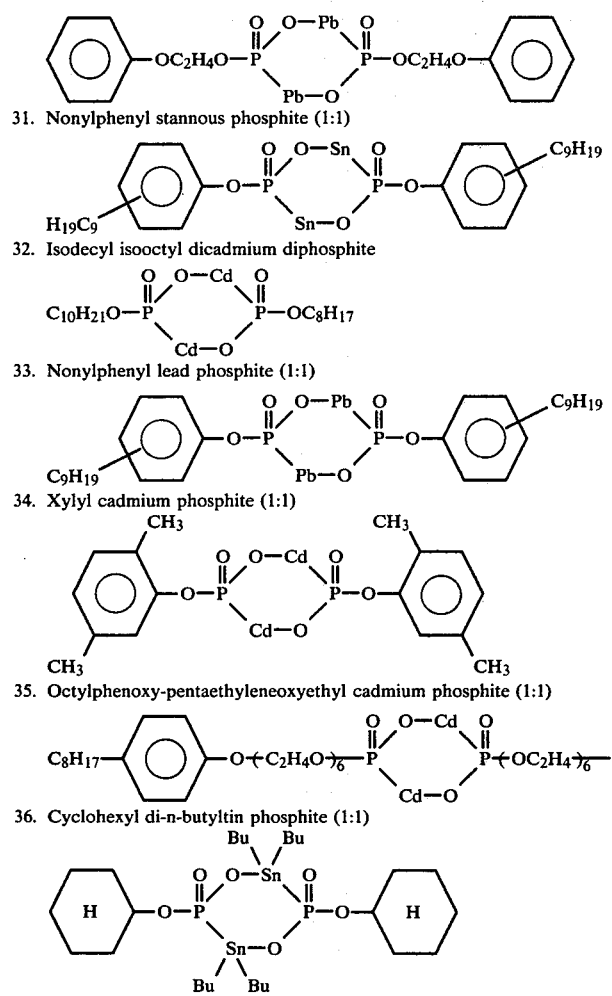

31. Nonylphenyl stannous phosphite (1:1)
32. Isodecyl isooctyl dicadmium diphosphite
33. Nonylphenyl lead phosphite (1:1)
34. Xylyl cadmium phosphite (1:1)
35. Octylphenoxy-pentaethyleneoxyethyl cadmium phosphite (1:1)
36. Cyclohexyl di-n-butyltin phosphite (1:1)

EXAMPLES 1–1 to 1–6

A sheet of 1 mm in thickness was prepared by mixing on a two roll mill the following formulation, and submitted to oven heat stability (175° C.), initial color and plate-out tests.

The stabilizer compositions used and the test results are shown in Table—2.

TABLE 2

| No. | Stabilizers | Amount | Heat Stab. Min. | Initial Color | Clarity | Plate Out Value | Weatherability Hours |
|---|---|---|---|---|---|---|---|
| Control | | | | | | | |
| 1-1 | Ba Stearate | 0.7 | 45 | Medium | Medium | 150 | 260 |
| | Zn Stearate | 0.3 | | | | | |
| 1-2 | (iso $C_8H_{17}O-\overset{\overset{O}{\|}}{\underset{H}{P}}-O)_2Ba$ | 0.7 | 60 | a little better | Good | 100 | 340 |
| | Zn Stearate | 0.3 | | | | | |
| Example | | | | | | | |
| 1-1 | Isooctyl barium phosphite (1:1) | 0.7 | 75 | Very Good | Very Good | 5 | 550 |
| | Zn Stearate | 0.3 | | | | | |
| 1-2 | Tridecyl barium phosphite (1:1) | 0.7 | 80 | Very Good | Very Good | 5 | 580 |
| | Zn Octoate | 0.2 | | | | | |
| 1-3 | p-Methylbenzyl zinc phosphite (1:1) | 0.2 | 75 | Very | Very | 15 | 540 |

TABLE 2-continued

| No. | Stabilizers | Amount | Heat Stab. Min. | Initial Color | Clarity | Plate Out Value | Weatherability Hours |
|---|---|---|---|---|---|---|---|
| 1-4 | Ba 12-OH-Stearate<br>2-Butoxyethyl barium phosphite (1:1) | 0.7<br>0.7 | 90 | Good | Good<br>Very Good | 10 | 610 |
| 1-5 | Zn p-t-butylbenzoate<br>Isodecyl 2-phenoxyethyl barium diphosphite | 0.3<br>0.7 | 85 | Very Good | Very Good | 5 | 590 |
| 1-6 | Zn Laurate<br>Ba, Zn myristate<br>Nonylphenyl calcium phosphite (1:1) | 0.2<br>0.6<br>0.2 | 95 | Very Good | Very Good | 10 | 580 |

The results of these tests show that the stabilizer compositions containing a metal carboxylic acid salt and a phosphorous acid monoester metal salt with a 1:1 molar ratio of phosphorous ester to metal are far superior in every property tested to a prior art composition of carboxylic acid metal salts or a prior art composition of a metal carboxylic acid salt with a phosphorous acid monoester metal salt having a different (2:1) molar ratio of phosphorous acid ester to metal. The contrast between Control 1-2 and Example 1-1, where the sole difference is the molar ratio of phosphorous acid monoester to metal, is particularly striking.

EXAMPLES 2-1 to 2-14

Milled sheets of PVC with various zinc containing combinations were submitted to heat stability (175° C.), plate-out and weatherability tests.

The stabilizers used and the test results are shown in Table 3.

| (FORMULATION) | |
|---|---|
| PVC (Geon 103EP) | 100 parts by weight |
| DOP | 50 |
| Stearic acid | 0.3 |
| Epoxidized soybean oil | 2.0 |
| Zn toluate | 0.7 |
| Stabilizer (Table 3) | Variable weights* |

*equivalent in moles of metal to 1.1 part by weight of Ba nonylphenolate.

TABLE 3

| NO. | STABILIZERS (phr) | Heat Stability 175° C. Min. | Plate out Value | Weatherability Hours |
|---|---|---|---|---|
| Control | | | | |
| 2-1 | Ba nonylphenolate (1.1 part by weight) | 85 | 350 | 800 |
| 2-2 | Ba-tetraphenyl-diphosphite | 20 | 20 | 900 |
| 2-3 | Ba-tetratridecyl-diphosphite | 30 | 10 | 900 |
| EXAMPLE | | | | |
| 2-1 | Octyl barium phosphite (1:1) | 95 | 5 | 1500 |
| 2-2 | Tridecyl barium phosphite (1:1) | 100 | 5 | 1400 |
| 2-3 | Octadecyl barium phosphite (1:1) | 105 | 5 | 1700 |
| 2-4 | Benzyl tridecyl dibarium diphosphite | 100 | 10 | 1500 |
| 2-5 | 2-Butoxyethyl barium phosphite (1:1) | 95 | 5 | 1600 |
| 2-6 | Isodecyl 2-phenoxyethyl dibarium diphosphite | 115 | 5 | 1600 |
| 2-7 | p-Tolylbarium phosphite (1:1) | 120 | 10 | 1700 |
| 2-8 | p-t-butylphenyl tridecyl dibarium diphosphite | 115 | 5 | 1500 |
| 2-9 | 2-(2-methoxyethoxy0 ethyl nonylphenyl dibarium diphsophite | 110 | 5 | 1500 |
| 2-10 | p-Xylyl barium phosphite (1:1) | 110 | 5 | 1700 |
| 2-11 | Octylphenoxy-pentaethylenoxyethyl barium phosphite (1:1) | 110 | 5 | 1700 |
| 2-12 | Nonylphenoxy-heptaethylenoxyethyl butyl dibarium diphosphite | 115 | 5 | 1500 |
| 2-13 | Cyclohexyl barium phosphite (1:1) | 120 | 10 | 1600 |
| 2-14 | Barium nonylphenolate 0.5 | | | |

TABLE 3-continued

| NO. | STABILIZERS (phr) | Heat Stability 175° C. Min. | Plate out Value | Weatherability Hours |
|---|---|---|---|---|
| | 2(2-methoxyethoxy)ethyl nonylphenyl dibarium diphosphite 0.5 | 115 | 30 | 1400 |

The results show that the stabilizer compositions of this invention are dramatically superior to prior art compositions, particularly in plate-out and weatherability.

EXAMPLES 3-1 to 3-10

The performance tests shown were carried out on samples milled up according to the following formulation for agricultrual film.

The metal-containing organic phosphorus compound added to each formulation and the test results are shown in Table 4.

| (FORMULATION) | |
|---|---|
| PVC (Geon 103EP) | 100 parts by weight |
| DOP | 45 |
| Trixylylphosphate | 5 |
| Epoxidized soybean oil | 3 |
| Bisphenol A diglycidyl ether (Epikote 828) | 2 |
| Ba Stearate | 0.4 |
| Zn Stearate | 0.8 |
| Diphenylisooctylphosphite | 0.5 |
| Sorbitan monopalmitate (anti-fog additive and lubricant) | 1.5 |
| Samples (Table 4) | 0.8 |

| NO. | SAMPLES | STABILITY (190° C.) Min. | WEATHERABILITY Hours |
|---|---|---|---|
| Control | | | |
| 3-1 | None | 60 | 600 |
| 3-2 | Ba bis(monoisooctyl acidphosphate) | 100 | 1300 |
| 3-3 | Ca bis(monotridecyl acidphosphate) | 90 | 1200 |
| EXAMPLE | | | |
| 3-1 | Octyl barium phosphite (1:1) | 115 | 2500 |
| 3-2 | Octyl tridecyl dicalcium diphosphite | 120 | 2150 |
| 3-3 | Tridecyl magnesium phosphite (1:1) | 115 | 2550 |
| 3-4 | Dodecyl strontium phosphite (1:1) | >120 | 2400 |
| 3-5 | 2(2-Butoxyethoxy)ethyl magnesium phosphite (1:1) | >120 | 2200 |
| 3-6 | Isodecyl strontium phosphite (1:1) | 115 | 1950 |
| 3-7 | Phenyl strontium phosphite (1:1) | 120 | 2250 |
| 3-8 | p-Tolyl barium phosphite (1:1) | >120 | 1900 |
| 3-9 | p-Xylyl barium phosphite (1:1) | >120 | 2300 |
| 3-10 | Phenyl tridecyl dizinc diphosphite | 115 | 2600 |

As shown by the above results, agricultural film formulations containing the stabilizer compositions of this invention were dramatically improved over prior art formulations.

EXAMPLES 4-1 to 4-11

The same tests as in Examples 1-1 to 1-4 were carried out with a composition of this invention to which varying organic phosphites were added.

The organic phosphites used and the test results are shown in the following Table-5.

| (FORMULATION) | |
|---|---|
| PVC | 100 parts by weight |
| DOP | 50 |
| Stearic acid | 0.3 |
| Zn toluate | 0.7 |
| Tridecyl barium phosphite (1:1) | 0.7 |
| Epoxidized linseed oil | 1.0 |

Organic phosphite (Table 5) as shown

TABLE 5

| Example No | Organic Phosphite Compounds | Amount | Heat Stability 180° C. min | Initial* Color | Clarity* |
|---|---|---|---|---|---|
| 4-1 | none | — | 80 | good | good |
| 4-2 | monoisodecyl acid phosphite | 0.1 | 95 | very good | very good |
| 4-3 | diisodecyl acid phosphite | 0.1 | 100 | " | " |
| 4-4 | diphenyl acid phosphite | 0.2 | 105 | " | " |
| 4-5 | mono-2-ethylhexyldiphenyl phosphite | 0.5 | 110 | " | " |
| 4-6 | ditridecyl phenyl phosphite | 0.5 | 120 | " | " |
| 4-7 | diisodecyl phenyl phosphite | 0.3 | 110 | " | " |
| 4-8 | tris(nonylphenyl) phosphite | 0.3 | 115 | " | " |
| 4-9 | tris(2-4-di-t-butylphenyl) phosphite | 0.3 | 120 | " | " |
| 4-10 | triphenyl phosphite | 0.5 | 105 | " | " |

TABLE 5-continued

| Example No | Organic Phosphite Compounds | Amount | Heat Stability 180° C. min | Initial* Color | Clarity* |
|---|---|---|---|---|---|
| 4-11 | tridecyl diphenyl phosphite | 0.3 | 115 | " | " |

*compared to Control 1-1

These results demonstrate the helpful synergism of stabilizer compositions of this invention with organic phosphites.

EXAMPLES 5-1 to 5-15

To observe the synergistic effect when there are incorporated in PVC other additives together with the stabilizer composition of this invention, heat stability tests were carried out with samples of the following formulation.

The additives used and the test results are shown in Table 6.

| (Formulation) | |
|---|---|
| PVC (Geon 103EP) | 100 parts by weight |
| DOP | 48 |
| Epoxidized soybean oil | 2.0 |
| Zn octoate | 0.2 |
| Octyl tridecyl dicalcium diphosphite | 0.7 |
| Stearic acid | 0.3 |
| Additives (Table-6) | |

Table 6

| Ex. No. | Additives | Amount (phr) | Heat Stability (185° C.) mins |
|---|---|---|---|
| 5-1 | none | — | 75 |
| 5-2 | BHT antioxidant | 0.2 | 120 |
| 5-3 | dilaurylthiodipropionate | 0.2 | 120 |
| 5-4 | diphenylthiourea | 0.2 | 120 |
| 5-5 | thiodiglycol bis(aminocrotonate) | 0.3 | 120 |
| 5-6 | stearyl acid phosphate | 0.3 | 90 |
| 5-7 | pentaerythritol | 0.3 | 100 |
| 5-8 | tris(hydroxyethyl)isocyanurate | 0.3 | 105 |
| 5-9 | dehydroacetic acid | 0.05 | 90 |
| 5-10 | Zn dehydroacetate | 0.3 | 90 |
| 5-11 | benzoylacetone | 0.05 | 95 |
| 5-12 | dibenzoylmethane | 0.05 | 95 |
| 5-13 | sorbitol | 0.3 | 100 |
| 5-14 | nonylphenoxypolyethoxy phosphoric acid | 0.2 | 110 |
| 5-15 | tridecyloxypolyethoxy phosphoric acid | 0.2 | 115 |

These results show the helpful interaction of the above additives with the stabilizer composition of this invention.

EXAMPLES 6-1 to 6-4

To examine the effect in a polymer blend of PVC and ABS, a sheet was prepared according to the following formulation, and used to measure heat stability at 190° C., plate-out value and weatherability.

The stabilizers used and the test results are shown in Table 7.

| (FORMULATION) | |
|---|---|
| PVC (Geon 103EP-8) | 100 parts by weight |
| ABS (Blendex 111) | 10 |
| Epoxidized soybean oil | 3 |
| Ca stearate | 0.2 |
| Tetra ($C_{12-15}$ alkyl)bis phenol diphosphite | 1.5 |
| Samples (Table 7) | 1.2 total, as shown |

TABLE 7

| No. | SAMPLE | Amount | HEAT STABILITY (190° C.) Min. | PLATE OUT VALUE mg/kg | WEATHERABILITY HOURS |
|---|---|---|---|---|---|
| Control | | | | | |
| 6-1 | Ca ricinoleate | 0.7 | 75 | 250 | 600 |
| | Zn octoate | 0.5 | | | |
| EXAMPLES | | | | | |
| 6-1 | Octyl tridecyl dicalcium diphosphite | 0.7 | 90 | 10 | 1100 |
| | Zinc 2-ethylhexoate | 0.5 | | | |
| 6-2 | p-Methylbenzyl zinc phosphite (1:1) | 1.2 | 100 | 5 | 950 |
| 6-3 | Nonylphenyl calcium phosphite (1:1) | 0.7 | 105 | 15 | 900 |
| | Zinc laurate | 0.5 | | | |
| 6-4 | Calcium ricinoleate | 0.7 | 100 | 15 | 1050 |
| | Phenyl tridecyl dizinc diphosphite | 0.5 | | | |

These results show that PVC—ABS polymer blends are improved in each property tested by the stabilizer compositions of this invention.

EXAMPLES 7-1 and 7-2

A sheet of 1 mm in thickness was prepared by milling each of the following formulations and submitted to heat-ageing at 190° C., initial color, plate-out, and weatherability measurements.

The results are shown in the following Table 8.

| (FORMULATION) | |
|---|---|
| PVC (Geon 103EP) | 100 parts by weight |
| DOP | 20 |
| Epoxidized soybean oil | 2 |
| Stearic acid | 0.2 |
| Monooctyldiphenyl phosphite | 0.5 |
| Stabilizer as shown in Table 8 | | tests were carried out according to the following formulation.

The additives used and the test results are shown in Table 9.

| (FORMULATION) | |
|---|---|
| PVC (Geon 103EP) | 100 parts by weight |
| DOP | 48 |
| Epoxidized soybean oil | 2.0 |
| Tridecyl stannous phosphite (1:1) | 0.4 |
| Ba-nonylphenolate | 0.7 |
| Stearic acid | 0.3 |
| Additives (Table 9) | |

TABLE 9

| EXAMPLE NO. | ADDITIVES | AMOUNT | HEAT STABILITY (185° C.) Min. |
|---|---|---|---|
| 8-1 | None | — | 75 |
| 8-2 | BHT | 0.2 | 120 |
| 8-3 | DLTDP | 0.2 | 120 |
| 8-4 | Diphenylthiourea | 0.2 | 120 |
| 8-5 | Thiodiglycol bis(aminocrotonate) | 0.3 | 120 |
| 8-6 | Stearyl acid phosphate | 0.3 | 90 |
| 8-7 | Pentaerythritol | 0.3 | 100 |
| 8-8 | Tris(hydroxyethyl)isocyanurate | 0.3 | 105 |
| 8-9 | Dehydro acetic acid | 0.05 | 90 |
| 8-10 | Zn dehydroacetate | 0.1 | 90 |
| 8-11 | Benzoylacetone | 0.05 | 95 |
| 8-12 | Dibenzoylmethane | 0.05 | 95 |
| 8-13 | Sorbitol | 0.3 | 100 |
| 8-14 | Nonylphenoxypolyethoxy phosphoric acid | 0.2 | 110 |
| 8-15 | Lauroxypolyethoxy phosphoric acid | 0.2 | 115 |

The results show the favorable effect of using these

TABLE 8

| NO. | STABILIZERS | AMOUNT (PARTS BY WEIGHT) | HEAT STABILITY (190° C.) Min. | INITIAL COLOR* | CLARITY* | PLATE OUT VALUE | WEATHERABILITY Hrs. |
|---|---|---|---|---|---|---|---|
| Control 7-1 | Ba stearate | 0.6 | 90 | medium | medium | 120 | 800 |
|  | Cd stearate | 0.4 | | | | | |
| 7-2 | (iso—C$_8$H$_{17}$OP(=O)(H)—O)$_2$Cd | 0.3 | 75 | Inferior | Good | 100 | 600 |
|  | Ba stearate | 0.7 | | | | | |
| EXAMPLE 7-1 | Ba stearate | 0.7 | | | | | |
|  | 2-ethylhexyl cadmium phosphite (1:1) | 0.3 | 120 | Very Good | Very Good | 5 | 1900 |
| 7-2 | Ba-p-t-butyl benzoate | 0.6 | | | | | |
|  | Phenoxyethyl lead phosphite (1:1) | 0.3 | 120 | Good | Very Good | 10 | 1800 |

*compared to Control 7-1

The results show the much improved heat stability and excellent plate-out and weathering properties of the compositions stabilized according to this invention.

EXAMPLES 8-1 to 8-15

To observe the synergistic effects when there are incorporated in PVC other additives together with the stabilizer composition of this invention, heat stability additives together with a stabilizer composition of this invention.

EXAMPLES 9-1 and 9-2

To observe the effects of stabilizer combinations of this invention on PVC—ABS polymer blend, a sheet was prepared and used to measure heat stability at 190° C., plate-out value and weatherability according to the following formulation.

The stabilizers used and the test results are shown in Table 10.

| (FORMULATION) | | |
|---|---|---|
| PVC (Geon 103EP-8) | 100 | parts by weight |
| ABS (Blendex 111) | 10 | |
| Epoxidized soybean oil | 3 | |
| Ba-stearate | 0.8 | |
| Tetra (C$_{12-15}$ alkyl) bisphenol A diphosphite | 1.5 | |
| Stabilizers | 0.6 | total |

TABLE 10

| No. | Stabilizers | Amount | HEAT STABILITY (190° C.) Min. | PLATE OUT VALUE | WEATHER-ABILITY Hrs. |
|---|---|---|---|---|---|
| Control | | | | | |
| 9-1 | Cd-stearate | 0.3 | | | |
| | 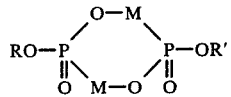 | 0.3 | 90 | 50 | 700 |
| EXAMPLE | | | | | |
| 9-1 | Octyl tridecyl dilead diphosphite | 0.4 | | | |
| | Zinc octoate | 0.2 | 105 | 10 | 1500 |
| 9-2 | Nonylphenyl stannous phosphite (1:1) | 0.6 | 105 | 5 | 1800 |

These results show that PVC—ABS polymer blends are greatly improved by stabilizer compositions of this invention.

We claim:

1. A stabilizer composition capable of enhancing the resistance to deterioration in color, clarity, and compatibility of a vinyl chloride polymer composition when heated at 175° C. comprising (A) at least one metal salt of a monohydric phenol having 6 to 30 carbon atoms or of a nitrogen and sulfur free monocarboxylic acid having 6 to 24 carbon atoms of magnesium, calcium, zinc, strontium, barium, cadmium, stannous tin, lead, or dialkyltin, and (B) per part of salt (A) from 0.1 to 10 parts of at least one phosphorous acid monoester metal salt in which the molar ratio of phosphrous acid monoester to metal is 1:1, the phosphorous acid monoester metal salt being represented by the formula $$\begin{array}{c} \text{RO}-\text{P} \diagup \text{O}-\text{M} \diagdown \text{P}-\text{OR}' \\ \| \diagdown \text{M}-\text{O} \diagup \| \\ \text{O} \quad\quad\quad \text{O} \end{array}$$

in which M represents a magnesium, calcium, zinc, strontium, barium, cadmium, stannous tin, or lead atom or a dialkyltin group, and each of R and R' independently is an alkyl group having 1 to 20 carbon atoms, an aralkyl group having 7 to 20 carbon atoms, a cycloalkyl group having 5 to 20 carbons, an aryl or alkaryl group having 6 to 24 carbon atoms and not more than one ortho-substituent, or an ether-alcohol group having 3 to 40 carbon atoms and 1 to 12 ether groups.

2. A stabilizer composition according to claim 1 in which the phosphorous acid monoester salt is an aliphatic monoester salt.

3. A stabilizer composition according to claim 1 in which the phosphorous acid monoester salt is an ether-alcohol monoester salt.

4. A stabilizer composition according to claim 1 in which the phosphorous acid monoester salt is an aromatic monoester salt.

5. A stabilizer composition according to claim 1 in which the salt (A) is a zinc carboxylate.

6. A stabilizer composition according to claim 1 in which the salt (A) is a barium salt of a phenol.

7. A stabilizer composition according to claim 1 in which R and R' are dissimilar.

8. A stabilizer composition according to claim 1 containing as an additional stabilizing ingredient at least one compound selected from the group consisting of 1,2-epoxides, organic phosphite triesters, organic phosphite diesters, alkyl acid phosphate esters, ether alcohol acid phosphate esters, phenols, thiodipropionate esters, aliphatic polyhydroxy compounds, ketoacetic acid compounds, and diacylmethanes.

9. A vinyl chloride polymer composition having enhanced resistance to deterioration in color, clarity, and compatibility when heated at 175° C., comprising a vinyl chloride polymer and per 100 parts by weight thereof 0.01 to 10 parts by weight of a stabilizer composition according to claim 1.

10. A vinyl chloride polymer composition according to claim 9 in which the vinyl chloride polymer is a homopolymer of vinyl chloride.

11. A vinyl chloride polymer composition according to claim 9 containing as an additional polymer ingredient a polymer of acrylonitrile, butadiene, and styrene.

* * * * *